United States Patent [19]

Tanaka et al.

[11] 3,894,042

[45] July 8, 1975

[54] PREPARATION OF INDOLES AND CATALYST COMPOSITIONS USED IN THEIR PREPARATION

[75] Inventors: Kunio Tanaka; Toshio Fukada, both of Hino, Japan

[73] Assignee: Teijin Ltd., Osahn, Japan

[22] Filed: Jan. 16, 1973

[21] Appl. No.: 324,084

[30] Foreign Application Priority Data
Jan. 25, 1972 Japan.................................. 47-9244
Apr. 22, 1972 Japan................................ 47-40766

[52] U.S. Cl............................. 260/319.1; 252/474
[51] Int. Cl............................................. C07d 27/56
[58] Field of Search.................................. 260/319.1

[56] References Cited
UNITED STATES PATENTS
2,409,676 10/1946 Gresham et al.................. 260/319.1

*Primary Examiner*—Joseph A. Narcavage
*Attorney, Agent, or Firm*—Sherman & Shalloway

[57] ABSTRACT

In the process for preparing indoles by the vapor phase catalytic reaction of the 2-alkyl-and/or 2-alkenylanilines at an elevated temperature in the substantial absence of molecular oxygen; the improvement which comprises carrying out said vapor phase catalytic reaction in the presence of a catalyst comprising iron oxide and an alkali metal compound in the presence of steam.

7 Claims, No Drawings

PREPARATION OF INDOLES AND CATALYST COMPOSITIONS USED IN THEIR PREPARATION

This invention relates to an improved process for preparing the indoles from their corresponding 2-alkyl- or 2-alkenylanilines of the subsequently given formula (1) in good yield and at excellent selectivity as well as greatly improved catalyst life and, in addition to inexpensive and improved catalyst compositions used in said process.

More specifically, the invention relates to a process and catalyst compositions therefor, which is characterized in that in the process for preparing the corresponding indoles by the vapor phase catalytic reaction of the 2-alkyl- or 2-alkenylanilines of the formula

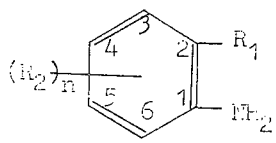

(1)

wherein $R_1$ is selected from the group consisting of substituted and unsubstituted alkyl groups of $C_2$ or more and substituted and unsubstituted alkenyl, $R_2$ is selected from the group consisting of amino, alkylamino, hydroxy, alkoxy and cyano, halogens, and substituted or unsubstituted hydrocarbon of not more than $C_8$, and $n$ is an integer 0 to 4, which several $R_2$-groups may be the same or different when $n$ is 2 – 4, at an elevated temperature in the substantial absence of molecular oxygen; said vapor phase catalytic reaction is carried out in the presence of steam in the presence of a catalyst comprising iron oxide and an alkali metal compound, preferably a catalyst consisting of 15 – 99 % by weight, calculated as $Fe_2O_3$, of iron oxide and 1 – 85 % by weight of an alkali metal compound, based on the catalyst weight.

A number of proposals for preparing the indoles by the vapor phase catalytic reaction of the 2-alkyl- or 2-alkenylanilines of the foregoing formula (1) at elevated temperatures in the substantial absence of molecular oxygen have been made. In this type of reaction a cyclization reaction due to dehydrogenation is set up between the alkyl or alkenyl group in the 2-position and the vicinal $NH_2$ group to form the indole structure. As another type of reaction, there is known a process of carrying out the cyclization reaction by means of an oxidation-dehydrogenation reaction in the presence of molecular oxygen to form the indole structure (the process of U.S. Pat. No. 3,271,414 which uses a catalyst such as phosphorus oxyvanadate in the copresence of oxygen and the process of German Laid-Open Application No. 2,049,752 which uses a mixed catalyst of such as silica or mixed oxides in the copresence of oxygen).

The former type is an endothermic reaction, while the latter is an exothermic reaction. Thus, the catalytic reaction mechanisms of these two types of reactions are different. Heretofore, the former type reaction possessed the drawback that the change in the catalytic activity with the passage of time was great and the catalyst life was short, whereas the latter type reaction had the drawback that it was beset with much side reactions due to the molecular oxygen and hence its selectivity was small.

The present invention is directed to an improved process for the preparation of indoles by the former type of reaction.

As a prior art proposal of this type, U.S. Pat. No. 2,409,676 uses a $TiO_2$ catalyst. However, only unsatisfactory results are obtained with respect to the selectivity and catalyst life by this method. On the other hand, the *Journal of American Chemical Society*, 73, 3080 (1951) reports of the use of a Cu—Cr type catalyst. In this method, the results obtained with respect to the catalytic activity, selectivity and catalyst life were in all cases unsatisfactory. Further, U.S. Pat. No. 2,886,573 suggests the use of a cobalt molybdate catalyst. The catalytic activity, selectivity and catalyst life were also unsatisfactory in the case of this method.

Of the prior art proposals concerning this type of reaction, those yielding the most satisfactory results were those which use a catalyst of the noble metal type such as platinum. Of these proposals, U.S. Pat. No. 2,953,575 which uses either Pt or Pd, U.S. Pat. No. 2,891,965 which uses a sulfur compound-treated Pt and U.S. Pat. No. 3,285,932 which uses Pt containing an alkali metal compound are known. In the method of the hereinbefore-indicated first proposal, a considerable improvement is achieved in the initial activity and selectivity, but there is the shortcoming that the catalyst life is exceedingly poor. It is mentioned that the catalyst activity declines by 56 % when the reaction is operated continuously for 14 hours. On the other hand, in the method of the foregoing second proposal there was the drawback that the catalyst life was short, it being mentioned that a decline of 32 % takes place in the catalytic activity in the case of a continuous reaction of 4 hours. Thus, in either of the foregoing cases satisfactory results were not obtainable. In the case of the method of the foregoing third proposal which yields the best results of these methods using a noble metal, there was a slight improvement over the method of the second proposal in respect of the catalyst life, but the improvement in the catalyst life was not fully satisfactory. Further, the tendency to aggravation of the initial activity could not be avoided, as compared with the method of the first proposal.

Again, the use of the expensive noble metals such as Pt is mandatory in all of the foregoing three methods, and hence there is the disadvantage from the standpoint of practicality as well as cost.

In consequence of our researches with a view to providing an improved catalyst composition and process using same, in which the drawbacks and disadvantages of these foregoing methods have been overcome, we found that by using in the hereinbefore-mentioned vapor phase catalytic reaction of the endothermic reaction type a catalyst composition comprising the low-cost and readily available iron oxide and alkali metal compound, which had not been proposed to date, it was possible to provide this type of vapor phase catalytic reaction with excellent yield and selectivity as well as improved catalyst life.

It is therefore an object of this invention to provide an improved process for the preparation of the indoles wherein the foregoing drawbacks or disadvantages of the conventional methods have been overcome and to a catalyst composition to be used in such a process.

Other objects and advantages of the invention will become apparent from the following description.

The catalyst composition to be used in the present invention is composed of iron oxide and an alkali metal compound, and it is desirably composed, based on the catalyst weight, of iron oxide, calculated as $Fe_2O_3$, in an amount of 15 – 99 %, preferably 20 – 95 %, and still more preferably 25 – 95 % by weight and an alkali metal compound in an amount of 1 – 85 %, preferably 5 – 80 %, and still more preferably 5 – 75 % by weight. More particularly, it is composed, based on the catalyst weight, of iron oxide, calculated as $Fe_2O_3$, in an amount of 35 – 95 %, and particularly 45 – 95 % by weight, and an alkali metal compound in an amount of 5 – 65 %, and particularly 5 – 55 % by weight.

When the content of the iron oxide, calculated as $Fe_2O_3$, is an excessively small amount of less than 15 % by weight or the content of the alkali metal compound is excessively large and exceeds 85 % by weight, the catalytic activity becomes low. There is a further tendency to the catalyst becoming physically and chemically unstable. Hence, these components should be preferably used in amounts within the foregoing range. Again, when the content of the iron oxide exceeds 99 % by weight and the content of the alkali metal compound is an excessively small amount of less than 1 % by weight, the change of the catalytic activity with the passage of time is great and the life of the catalyst is shortened and, in addition, the selectivity for the indoles tends to become small. Hence, for these reasons also, the two components are preferably used in the amounts previously indicated.

Aside from the foregoing essential components of iron oxide and alkali metal compound, it is also possible to use in the invention catalyst composition of the present invention alkaline earth metal compounds in substitution for a part of the aforesaid alkali metal compound in an amount, based on the catalyst weight, of not more than 30 % by weight, and preferably in a weight ratio of 1:1 – 5:1, and still more preferably 1:1 – 2:1 to the alkali metal compound, which is the essential component.

Further, the catalyst composition to be used in the present invention can contain in addition to the foregoing essential components of iron oxide and alkali metal compound a compound of a metal selected from the group consisting of Cr, Mo, W, Bi, Al, Mn and Ce, as a stabilizer for improving the physical and chemical stability of the catalyst. The incorporation of these metal compounds in an amount of not more than 30 % by weight base on the catalyst weight will suffice.

It is not entirely clear what form the aforesaid iron oxide, one of the essential components of the catalyst composition to be used in the invention, takes under the vapor phase catalytic reaction conditions, i.e., whether it is in the form of FeO, $Fe_2O_3$, $Fe_3O_4$ or a mixture thereof. It is to be understood that the present invention is not limited in any way whatsoever as to this form. So far as we can infer at the present time, it is believed the iron oxide under the reaction conditions has a composition that can be expressed by that close to $Fe_3O_4$.

As the alkali metal compound, the other essential component of the catalyst composition used in the present invention, included are the compounds of the metals selected from Li, Na and K. As specific examples of such compounds, mention can be made of the oxides, hydroxides, carbonates, bicarbonates, phosphates, borates, acetates, chromates and bichromates of the foregoing metals. These compounds may be used either singly or in combination of two or more.

The hereinbefore-mentioned alkaline earth metal compounds that can be contained in the invention catalyst composition include the compounds of the metals selected from the group consisting of Be, Mg, Ca, Sr and Ba. As specific examples of such compounds, mention can be made of the oxides, hydroxides, carbonates, bicarbonates, phosphates, borates, acetates, chromates and bichromates of the foregoing metals, which compounds may be used either singly or in combination of two or more.

On the other hand, as the hereinbefore-mentioned stabilizer that can be contained in the catalyst composition of the invention, specific examples include the oxides of the hereinbefore-mentioned metals.

These catalyst components have been exemplified in the form that they take when preparing the catalyst, and it is to be understood that there is imposed no limitation as to what form they take after the preparation of the catalyst is completed or under the reaction conditions.

The invention catalyst composition may also contain a diluent, a binder or a carrier material, included being such, for example, as titania, asbestos, silicates, cement, kaolin and the like.

In preparing the invention catalyst composition, means which are known per se can be utilized, such as the mechanical mixing, molding, precipitation and co-precipitation techniques. Further, the catalyst composition may take the form of a powder, granules, pellets, hollow cylinders or any other known form. For instance, the catalyst composition can be obtained by mixing an iron oxide powder and an aqueous solution of the alkali metal compound into a pasty form and then molding this into a suitable form. Alternatively, usable is a method such as that of adding ammonia water to an aqueous iron nitrate solution, thoroughly washing the resulting precipitate, followed by mixing with an aqueous potassium nitrate solution, and thereafter drying, calcination and granulation to obtain the catalyst composition in granular form. The calcination of the catalyst composition can be carried out after the preparation of the composition, if required.

In accordance with the invention process, a 2-alkyl- or 2-alkenylaniline of the foregoing formula (1) is submitted to a vapor phase catalytic reaction using the aforesaid Fe-alkali metal type catalyst in the presence of steam at an elevated temperature, preferably 500°– 750°C., and still more preferably 550°– 700°C., in the substantial absence of molecular oxygen. When the reaction temperature is less than 500°C., the yield tends to decline, whereas when the temperature is in excess of 750°C., there is a tendency to setting up of decomposing and other side reactions. Hence, the adoption of a reaction temperature within the range indicated above is to be preferred.

Either the fixed bed or fluidized bed type of reaction vessel can be employed. Further, the unreacted reactants can be recycled and reused. Again, the reaction can be carried out under the conditions of reduced pressure, atmospheric pressure or superatmospheric pressure.

The reaction is preferably carried out at a liquid hourly space velocity of the 2-alkyl- or 2-alkenylaniline to the catalyst composition of 0.05 – 5 lit/lit catalyst/hr (i.e., 0.05 – 5 hr$^{-1}$), and still more preferably under the conditions of 0.1 – 2 hr$^{-1}$.

The reaction is carried out in the presence of steam but substantial absence of molecular oxygen such as air. Aside from steam, a member selected from the group consisting of ammonia, carbon dioxide, nitrogen and hydrocarbons can be used as a diluent. The use of steam or the conjoint use of steam with the other diluents is especially convenient for carrying out the reaction on a commercial scale with a minimum of decline in the activity of the catalyst even when used continuously over a prolonged period of time. The steam is best used in an amount of at least about one mol per mol of the 2-alkyl- or 2-alkenylanilines of formula (1). Since the use of steam in an unnecessarily large amount will result in an increase in the amount that the reaction and product systems must deal with, the amount of steam used is preferably held to within a suitable range. Usually used is an amount in the range of about 1 – 70 mols per mol of the 2-alkyl- or 2-alkenylanilines. When the amount used of the steam is an excessively small amount of less than about 1 mol, the effect of maintaining the activity of the catalyst over a continuously prolonged period, as hereinabove described, is lessened. Hence, it is preferably used in an amount of at least about one mol, and still more preferably about 2 – 50 mols, particularly about 5 – 40 mols.

When a substantial decrease in the activity of the catalyst composition takes place due to its continuous use, it can be reactivated by temporarily interrupting the feed of the 2-alkyl- or 2-alkenylanilines and passing steam through the system. Hence, when steam or a mixture of steam and other diluents is used in a necessary quantity as the carrier gas, it becomes possible to use the catalyst composition continuously over a long period of time without the necessity of the regeneration step.

The reaction for forming the corresponding indoles from the starting compounds of formula (1) of the invention process, if shown taking the case where $R_1$ is ethyl and $n$ is 0, i.e., in the case of 2-ethylaniline, can be shown by the following equation:

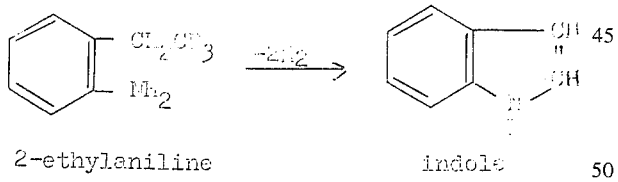

2-ethylaniline        indole

As the alkyl groups of $C_2$ or more in the hereinbefore-given formula (1), preferred are the alkyl groups of $C_2$ – $C_8$. As a specific examples, mention can be made of ethyl, propyl, butyl, amyl, hexyl and actyl. On the other hand, as the alkenyl groups of $R_1$ in the foregoing formula (1), preferred are the alkenyl groups of $C_2$ – $C_8$. As specific examples, included are such as vinyl, propenyl, butenyl, pentenyl, hexenyl and octenyl.

These alkyl or alkenyl groups may have substituent groups such, for example, as the aromatics as phenyl or an alicyclic group as cyclohexyl.

When such hydrocarbon groups are the alkyl or alkenyl groups defined in $R_1$, and are in the 6-position, and the $R_1$ and $R_2$ are the same, the same indoles can be formed by the cyclization reactions between $R_1$ and the $NH_2$ of 1-position or $R_2$ and the $NH_2$ of 1-position. However, when $R_1$ and $R_2$ are different, there are formed indoles as a result of the cyclization reaction between $R_1$ and the $NH_2$ of 1-position and, in addition, there are formed indoles resulting from the cyclization reaction between $R_2$ and the $NH_2$ of 1-position.

Further, as the $R_2$ in formula (1), included as desirable are the previously mentioned amino, alkylamino, hydroxy, alkoxy and cyano groups and halogens, as well as the acyclic hydrocarbon groups of not more than eight carbon atoms such, for example, as ethyl, propyl, butyl, vinyl and allyl groups and the cyclic hydrocarbon groups such, for example, as cyclohexyl and phenyl.

As specific examples of the starting compounds of formula (1), mention can be made of such as the following:

2-Ethylaniline, 2-isopropylaniline, 2-n-propylaniline, 2-n-butylaniline, 2-isobutylaniline, 2-sec-butylaniline, 2-n-amylaniline, 2-sec-amylaniline, 2-isoamylaniline, 2-allylaniline, 2-beta-butenylaniline, 2-beta-methyl-beta-propenylaniline, 2-beta-pentenylaniline, 2-n-hexylaniline, 2-n-octylaniline, 2-beta-ethylhexylaniline, 2-beta-phenylethylaniline, 2-beta-cyclohexylethylaniline, 2,6-diethylaniline, 2,4-diethylaniline, 2,6-diisopropylaniline, 2-ethyl-4-methylaniline, 2-ethyl-5-phenylaniline, 2-ethyl-4-hydroxyaniline, 2-ethyl-5-aminoaniline, 2-ethyl-5-cyanoaniline, 2-ethyl-5-chloroaniline, 2-ethyl-5-methoxyaniline, 2-ethyl-5-dimethylaminoaniline, 2-aminostyrene, 2-amino-alpha-methylstyrene, 2-amino-beta-methylstyrene, 2-amino-3-ethylstyrene, 2-amino-5-hydroxystyrene, 2,4-diaminostyrene, 2-amino-4-cyanostyrene, 2-amino-beta-phenylstyrene, 2-amino-4-phenylstyrene, 2-amino-5-methoxystyrene, 2-amino-4-dimethylaminostyrene, 2-amino-4-chlorostyrene, 2-ethyl-4,6-dimethylaniline, 2-amino-3,5-dimethylstyrene, 2-ethyl-3-methyl-5-aminoaniline, 2-ethyl-3-methyl-5-chloroaniline, 2-amino-4-chloro-6-methylaniline, 2-ethyl-4,5,6-trimethylaniline and 2-ethyl-3,4,5,6-tetramethylaniline.

The following examples will be given along with a control experiment for more fully illustrating several modes of operating the invention process.

EXAMPLE 1

Thirty-five milliliters of a cylindrical catalyst 3 millimeters in diameter and 5 millimeters long consisting of 87.9 weight % (Calculated as $Fe_2O_3$) of iron oxide, 9.6 weight % of potassium oxide and 2.5 weight % of chromium oxide was packed in a reactor having an inside diameter of 23 millimeters. Into this reactor was introduced a gaseous mixture of 2-ethylaniline and 33.6 molar times thereof of steam at a reaction temperature of 630°C. and a liquid hourly space velocity of 0.45 hr$^{-1}$. The changes in the per-pass yield and selectivity of indole with the passage of time at the several elapsed time periods after the start of the reaction are shown in Table 1.

TABLE 1

| Elapsed time period hr | Per-pass yield mol% | Selectivity mol% |
| --- | --- | --- |
| 6 – 12 | 44.1 | 84.3 |
| 12 – 24 | 44.4 | 84.5 |
| 48 – 72 | 44.0 | 84.0 |
| 96 – 120 | 44.3 | 84.5 |

TABLE 1-Continued

| Elapsed time period hr | Per-pass yield mol% | Selectivity mol% |
| --- | --- | --- |
| 216 – 240 | 44.0 | 83.8 |
| 456 – 480 | 44.2 | 84.1 |
| 696 – 720 | 44.2 | 84.3 |

CONTROL

Thirty-five milliliters of a cylindrical catalyst 3 millimeters in diameter and 3 millimeters long consisting of 0.5 weight % of Pt and 0.25 weight % of LiOH supported on activated alumina was packed in a reactor having an inside diameter of 23 millimeters. A gaseous mixture consisting of 2-ethylaniline and 10.0 molar times thereof of hydrogen was then introduced into the foregoing reactor at a reaction temperature of 450°C. and a liquid hourly space velocity of 0.45 $hr^{-1}$. The per-pass yield and selectivity of indole with the passage of time are shown in Table 2.

Table 2

| Elapsed time period hr | Per-pass yield mol % | Selectivity mol % |
| --- | --- | --- |
| 6 – 12 | 45.2 | 82.3 |
| 12 – 24 | 43.0 | 83.0 |
| 48 – 72 | 38.7 | 83.9 |
| 96 – 120 | 34.9 | 84.2 |
| 216 – 240 | 28.6 | 84.2 |
| 456 – 480 | 23.1 | 84.3 |
| 696 – 720 | 20.5 | 84.5 |

As is apparent from the results given in the foregoing table, the activity of the control composition is inferior to that of the invention composition. About 500 hours after the start of the reaction, the activity drops to less than one-half its initial activity.

EXAMPLE 2

Using the same catalyst and same reactor as in Example 1, a gaseous mixture of 2-aminostyrene and 26.4 molar times thereof of steam was introduced into the reactor at a reaction temperature of 615°C. and a liquid hourly space velocity of 0.35 $hr^{-1}$, with the consequence that the per-pass yield of indole was 44.5 mol%, and the selectivity was 86.0 mol%.

EXAMPLE 3

Example 1 was repeated except that a gaseous mixture consisting of a mixture of 2-ethylaniline and 2-aminostyrene (content of the latter 31.0 wt. %) and 26.7 molar times of said mixture of steam was introduced to the reactor at a reaction temperature of 660°C. and a liquid hourly space velocity of 0.9 $hr^{-1}$, with the consequence that the per-pass yield of indole was 45.5 mol%.

EXAMPLE 4

Example 1 was repeated except that a gaseous mixture of 2,6-diethylaniline and 33.1 molar times thereof of steam was introduced into the reactor at a reaction temperature of 585°C. and a liquid hourly space velocity of 0.1 $hr^{-1}$, with the consequence that ethylindole was obtained at a per-pass yield of 13.2 mol%.

EXAMPLE 5

The same catalyst and reactor as in Example 1 were used, and a gaseous mixture consisting of 2-betaphenylethylaniline and 43.8 molar times thereof of steam was introduced into the reactor at a reaction temperature of 600°C. and a liquid hourly space velocity of 0.2 $hr^{-1}$. As a result, there was obtained 2-phenylindole at a per-pass yield of 28.3 mol%.

EXAMPLE 6

Thirty-five milliliters of a cylindrical catalyst 3 millimeters in diameter and 5 millimeters long consisting of 54.9 weight % (calculated as $Fe_2O_3$) of iron oxide, 26.0 weight % of potassium carbonate, 2.4 weight % of chromium oxide and 16.7 weight % of cement was packed in a reactor having an inside diameter of 23 millimeters. This reactor was then introduced with a gaseous mixture of 2-ethylaniline and 12 molar times thereof of steam and 5 molar times thereof of ammonia at a reaction temperature of 630°C. and a liquid hourly space velocity of 0.5 $hr^{-1}$. The per-pass yield of indole was 40.4 mol%.

EXAMPLE 7

A reactor having an inside diameter of 23 millimeters was packed with 35 milliliters of a cylindrical catalyst 3 millimeters in diameter and 5 millimeters long consisting of 47.8 weight % (calculated as $Fe_2O_3$) of iron oxide, 46.7 weight % of potassium carbonate and 5.5 weight % of chromium oxide. This reactor was then introduced with a gaseous mixture consisting of 2-aminostyrene and 33.1 molar times thereof of steam at a reaction temperature of 630°C. and a liquid hourly space velocity of 0.3 $hr^{-1}$, with the consequence that indole was obtained at a per-pass yield of 45.0 mol %.

EXAMPLE 8

A reactor of 23-millimeter inside diameter was packed with 35 milliliters of a cylindrical catalyst 3 millimeters in diameter and 5 millimeters long consisting of 88.5 weight % (calculated as $Fe_2O_3$) of iron oxide, 6.5 weight % of sodium oxide and 5 weight % of aluminum oxide. To this reactor was then introduced a gaseous mixture consisting of 2-ethylaniline and 18 molar times thereof of steam at a reaction temperature of 615°C. and a liquid hourly space velocity of 0.3 $hr^{-1}$, with the consequence that indole was obtained at a per-pass yield of 36.6 mol%.

EXAMPLE 9

Using the same catalyst and reactor as in Example 8, a gaseous mixture consisting of 2-amino-alpha-methylstyrene and 6 molar times thereof of steam was introduced into the reactor at a reaction temperature of 570°C. and a liquid hourly space velocity of 0.4 $hr^{-1}$, with the consequence that a mixture of 2-methylindole and 3-methylindole was obtained at a per-pass yield of 12 mol%.

EXAMPLE 10

Thirty-five milliliters of a cylindrical catalyst 3 millimeters in diameter and 5 millimeters long consisting of 88.0 weight % (calculated as $Fe_2O_3$) of iron oxide, 7.5 weight % of potassium oxide and 4.5 weight % of magnesium oxide was packed into a reactor having an inside diameter of 23 millimeters. This reactor was then introduced with a gaseous mixture of 2-isopropylaniline and 18 molar times thereof of steam at a reaction temperature of 570°C. and a liquid hourly space velocity of 0.3 hr$^{-1}$. As a result, there was obtained a mixture of 2-methylindole and 3-methylindole at a per-pass yield of 12.2 mol%.

EXAMPLE 11

Using the same catalyst and reactor as in Example 10, a gaseous mixture consisting of 2-aminostyrene and 6 molar times thereof of steam was introduced into the reactor at a reaction temperature of 660°C. and a liquid hourly space velocity of 0.6 hr$^{-1}$, with the consequence that indole was obtained at a per-pass yield of 48.5 mol%.

EXAMPLE 12

A reactor of 23-millimeter inside diameter was packed with 35 milliliters of a cylindrical catalyst 3 millimeter in diameter and 5 millimeter long consisting of 94.3 weight % (calculated as Fe$_2$O$_3$) of iron oxide, 3.0 weight % of lithium oxide and 2.7 weight % of chromium oxide. This reactor was then introduced with a gaseous mixture of 2-ethylaniline and 26.9 molar times thereof of steam at a reaction temperature of 615°C. and liquid hourly space velocity of 0.35 hr$^{-1}$. There was obtained as a result indole at a per-pass yield of 39.0 mol%.

EXAMPLE 13

A reactor having an inside diameter of 23 millimeters was packed with 35 milliliters of a cylindrical catalyst 3 millimeters in diameter and 5 millimeters long consisting of 26.8 weight % (calculated as Fe$_2$O$_3$) of iron oxide, 57.2 weight % of potassium carbonate and 16.0 weight % of chromium oxide. To this reactor was then introduced a gaseous mixture consisting of 2-aminostyrene and 33.1 molar times thereof of steam at a reaction temperature of 615°C. and a liquid hourly space velocity of 0.35 hr$^{-1}$, with the consequence that indole was obtained at a per-pass yield of 40.5 mol%.

We claim:

1. In the process for preparing indoles by the vapor phase catalytic reaction of compounds of the following formula:

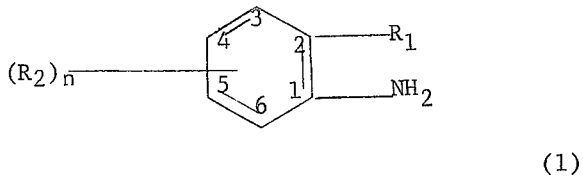

(1)

wherein R$_1$ is selected from the group consisting of phenyl or cyclohexyl substituted and unsubstituted alkyl of two to eight carbon atoms and phenyl or cyclohexyl substituted and unsubstituted alkenyl of two to eight carbon atoms, R$_2$ is selected from the group consisting of amino, alkylamino, hydroxy, alkoxy and cyano, halogens and the substituted and unsubstituted hydrocarbon groups of not more that C$_8$, and $n$ is an integer from 0 to 4, which several R$_2$-groups may be the same or different when $n$ is from 2 to 4, at an elevated temperature in the absence of molecular oxygen;

the improvement which comprises carrying out said vapor phase catalytic reaction in the presence of a catalyst consisting essentially of (a) an iron oxide selected from FeO, Fe$_2$O$_3$, Fe$_2$O$_4$ or mixtures thereof, (b) an alkali metal compound of a metal selected from Li, Na or K and (c) up to 30% by weight of the catalyst of a compound selected from the group consisting of a compound of an alkaline earth metal selected from Be, Mg, Ca, Sr or Ba and an oxide of a metal element selected from Cr, Mo, W, Bi, Al, Mn or Ce in the presence of steam.

2. The process according to claim 1 wherein said catalyst consists essentially of, based on the catalyst weight (a) 15–99% by weight, calculated as Fe$_2$O$_3$, of said iron oxide, (b) 1–85% by weight of said alkali metal compound and (c) up to 30% by weight of a compound selected from the group consisting of oxides, hydroxides, carbonates, bicarbonates, phosphates, borates, acetates, chromates and bichromates of Be, Mg, Ca, Sr and Ba and oxides of chromium or aluminum.

3. The process according to claim 1 wherein said reaction is carried out at a temperature ranging between 500° and 750°C.

4. The process according to claim 1 wherein the liquid hourly space velocity of said compound of formula (1) to the catalyst is 0.05 – 5 hr$^{-1}$.

5. The process according to claim 1 wherein said steam is used in an amount of 1 – 70 mols per mol of the compound of formula (1).

6. The process according to claim 1 wherein said catalyst consists essentially of, based on the catalyst weight, (a) 45–95% by weight, calculated as Fe$_2$O$_3$, of said iron oxide, (b) 5–55% by weight of said alkali metal compound and (c) up to 30% by weight of a compound selected from the group consisting of the oxides of chromium or aluminum.

7. The process according to claim 1 wherein said alkali metal compound is selected from the group consisting of the oxides, hydroxides, carbonates, bicarbonates, phosphates, borates, acetates, chromates and bichromates of a metal selected from the group consisting of Li, Na, or K.

* * * * *